United States Patent
Matsuoh et al.

(10) Patent No.: US 11,537,093 B2
(45) Date of Patent: Dec. 27, 2022

(54) MOBILE DEVICE AND MOBILE DEVICE SYSTEM

(71) Applicant: CITIZEN WATCH CO., LTD., Tokyo (JP)

(72) Inventors: Daisuke Matsuoh, Tokyo (JP); Ryutaro Uemura, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 357 days.

(21) Appl. No.: 16/809,832

(22) Filed: Mar. 5, 2020

(65) Prior Publication Data

US 2020/0285211 A1     Sep. 10, 2020

(30) Foreign Application Priority Data

Mar. 8, 2019  (JP) .............................. JP2019-043026
Aug. 9, 2019  (JP) .............................. JP2019-147136

(51) Int. Cl.
| | |
|---|---|
| *H04M 1/72412* | (2021.01) |
| *G05B 19/042* | (2006.01) |
| *G06F 9/54* | (2006.01) |
| *H04B 1/3827* | (2015.01) |
| *G04G 9/00* | (2006.01) |

(52) U.S. Cl.
CPC ......... *G05B 19/0423* (2013.01); *G06F 9/543* (2013.01); *H04B 1/385* (2013.01); *H04M 1/72412* (2021.01); *G04G 9/007* (2013.01); *G05B 2219/25274* (2013.01)

(58) Field of Classification Search
CPC ...... G05B 19/0423; G05B 2219/25274; G06F 9/543; G04G 9/007; H04B 1/385; H04M 1/7253

USPC ............................................ 700/23; 455/41.2
See application file for complete search history.

(56) References Cited

U.S. PATENT DOCUMENTS

| | | | | |
|---|---|---|---|---|
| 4,047,010 A | * | 9/1977 | Perotto .................. | H03M 11/00 382/187 |
| 4,149,257 A | * | 4/1979 | Nakagiri ................ | G04G 9/007 368/242 |

(Continued)

FOREIGN PATENT DOCUMENTS

| | | | |
|---|---|---|---|
| EP | 3489770 B1 * | 10/2020 | ............. G04B 19/04 |
| JP | 2002108634 A | 4/2002 | |

(Continued)

OTHER PUBLICATIONS

Nobuyuki Yashima et al. "Complete Introduction for IFTTT to become a man who can make a mutter and share information fully automatically", Weekly ASCII, vol. 27, No. 1024, Apr. 7, 2015, pp. 80-85 (7 pages total).

(Continued)

*Primary Examiner* — Hai V Nguyen
(74) *Attorney, Agent, or Firm* — Sughrue Mion, PLLC (57) ABSTRACT

A mobile device includes a drive unit for which correspondence between a command that is input and a drive signal that is output to an operation unit is predetermined, and a controller configured to output the command to the drive unit and cause the operation unit to operate. The controller includes a storage unit storing therein a user program including script language and outputs the command in accordance with the user program.

8 Claims, 8 Drawing Sheets

(56) References Cited

U.S. PATENT DOCUMENTS

| | | | | |
|---|---|---|---|---|
| 4,370,066 A * | 1/1983 | Yamaguchi | G04G 5/007 | 968/909 |
| 4,533,972 A * | 8/1985 | Ohashi | H01H 47/226 | 361/208 |
| 4,785,436 A * | 11/1988 | Sase | G04C 10/02 | 368/204 |
| 5,016,231 A * | 5/1991 | Kawaguchi | G04C 9/00 | 368/80 |
| 5,113,381 A * | 5/1992 | Sakamoto | G04C 3/146 | 368/80 |
| 5,289,452 A * | 2/1994 | Sakamoto | G04G 99/00 | 368/80 |
| 5,886,953 A * | 3/1999 | Kawahara | G04C 10/00 | 368/204 |
| RE38,197 E * | 7/2003 | Sakamoto | G04G 99/00 | 368/80 |
| 7,016,707 B2 * | 3/2006 | Fujisawa | H04W 88/02 | 455/461 |
| 8,594,720 B2 * | 11/2013 | Nakagawa | H04W 52/0254 | 455/343.1 |
| 8,854,925 B1 * | 10/2014 | Lee | G04G 19/12 | 368/282 |
| 9,036,455 B2 * | 5/2015 | Kato | G04G 19/06 | 368/64 |
| 9,044,171 B2 * | 6/2015 | Venkatraman | A61B 5/389 | |
| 9,086,687 B2 * | 7/2015 | Park | G04G 21/08 | |
| 9,100,805 B2 * | 8/2015 | Oshita | H04W 68/00 | |
| 9,191,482 B1 * | 11/2015 | Sidbury | H04M 1/04 | |
| 9,392,417 B1 * | 7/2016 | Venkatraman | H04W 4/029 | |
| 9,672,016 B2 * | 6/2017 | Sakamoto | G06F 9/448 | |
| 9,793,981 B2 * | 10/2017 | Lee | G06F 1/1626 | |
| 9,913,119 B2 * | 3/2018 | Kodama | H04L 67/52 | |
| 9,946,229 B2 * | 4/2018 | Park | G04G 21/04 | |
| 10,401,807 B2 * | 9/2019 | Jo | G05B 15/02 | |
| 10,684,592 B2 * | 6/2020 | Chang | G04G 9/0082 | |
| 10,997,660 B1 * | 5/2021 | Webster | G06Q 40/06 | |
| 11,092,459 B2 * | 8/2021 | Hoffman | G04G 21/08 | |
| 11,226,593 B2 * | 1/2022 | Watanabe | G04G 21/04 | |
| 2002/0115478 A1 * | 8/2002 | Fujisawa | H04M 1/72445 | 455/458 |
| 2010/0182880 A1 * | 7/2010 | Asami | G04C 10/02 | 368/204 |
| 2011/0059769 A1 * | 3/2011 | Brunolli | H04M 1/72448 | 455/556.1 |
| 2012/0127983 A1 * | 5/2012 | Chuang | G08B 21/0277 | 340/568.1 |
| 2012/0140601 A1 * | 6/2012 | Nakagawa | G04G 21/04 | 368/10 |
| 2013/0194896 A1 * | 8/2013 | Kato | G04B 99/00 | 368/66 |
| 2014/0171055 A1 * | 6/2014 | Oshita | H04M 1/72454 | 455/418 |
| 2014/0273849 A1 * | 9/2014 | Lee | G06F 1/3215 | 455/41.2 |
| 2014/0334271 A1 * | 11/2014 | Park | G01B 21/16 | 368/10 |
| 2014/0354441 A1 * | 12/2014 | Luna | H04L 41/0803 | 340/686.6 |
| 2015/0012581 A1 * | 1/2015 | Kim | H04L 67/55 | 709/201 |
| 2015/0020081 A1 * | 1/2015 | Cho | H04M 1/72436 | 719/318 |
| 2015/0065055 A1 * | 3/2015 | Newham | H04W 52/0251 | 455/41.3 |
| 2015/0066712 A1 * | 3/2015 | Altieri | G06Q 10/087 | 705/28 |
| 2015/0123898 A1 * | 5/2015 | Kim | H04L 51/224 | 345/156 |
| 2015/0168921 A1 * | 6/2015 | Lee | H04M 1/21 | 368/243 |
| 2015/0331678 A1 * | 11/2015 | Sakamoto | G06F 9/448 | 717/146 |
| 2015/0341068 A1 * | 11/2015 | Singhal | G06F 1/163 | 455/575.6 |
| 2015/0346843 A1 | 12/2015 | Piquerez et al. | | |
| 2016/0004276 A1 * | 1/2016 | Stroetmann | G06F 1/1698 | 361/679.03 |
| 2016/0044463 A1 * | 2/2016 | Lee | G06F 3/015 | 455/456.1 |
| 2016/0091864 A1 * | 3/2016 | Yang | G04C 3/008 | 368/12 |
| 2016/0117144 A1 * | 4/2016 | Soldner | H04L 63/00 | 700/94 |
| 2016/0154392 A1 * | 6/2016 | Jo | H04W 4/50 | 700/12 |
| 2016/0154624 A1 * | 6/2016 | Son | G06F 3/0416 | 704/235 |
| 2016/0162007 A1 * | 6/2016 | Kim | G06F 1/163 | 713/323 |
| 2016/0164559 A1 * | 6/2016 | Kim | H04W 4/185 | 455/575.6 |
| 2016/0202665 A1 * | 7/2016 | Park | G06F 3/165 | 368/225 |
| 2016/0254843 A1 * | 9/2016 | Terlizzi | H04W 12/06 | 455/41.2 |
| 2016/0334949 A1 * | 11/2016 | Sergott | G09G 5/34 | |
| 2016/0345124 A1 * | 11/2016 | Ahn | H04B 5/02 | |
| 2017/0064767 A1 * | 3/2017 | Sugiyama | H04W 84/18 | |
| 2017/0075411 A1 * | 3/2017 | Goldsmith | H04W 52/028 | |
| 2017/0164172 A1 * | 6/2017 | Kodama | H04W 4/21 | |
| 2017/0201929 A1 * | 7/2017 | Omori | H04W 68/005 | |
| 2017/0220121 A1 * | 8/2017 | Chiu | G06F 3/017 | |
| 2017/0269715 A1 * | 9/2017 | Kim | G06F 3/0485 | |
| 2017/0277361 A1 * | 9/2017 | Schulze | G06F 3/0484 | |
| 2017/0366657 A1 * | 12/2017 | Thompson | H04W 76/14 | |
| 2018/0331841 A1 * | 11/2018 | Ross | H04L 41/0895 | |
| 2019/0079455 A1 * | 3/2019 | Peters | G04G 21/04 | |
| 2019/0137942 A1 * | 5/2019 | Smith | G04G 21/04 | |
| 2019/0155224 A1 * | 5/2019 | Kang | G04B 25/00 | |
| 2019/0163142 A1 * | 5/2019 | Chang | G04G 21/08 | |
| 2019/0163144 A1 * | 5/2019 | Chang | G06F 3/041 | |
| 2019/0227497 A1 * | 7/2019 | Matsuoh | G04R 20/26 | |
| 2019/0251303 A1 * | 8/2019 | Fertakos | G06K 9/00 | |
| 2020/0149921 A1 * | 5/2020 | Hoffman | G01C 22/006 | |
| 2020/0280923 A1 * | 9/2020 | Matsuoh | H04W 76/14 | |
| 2020/0288008 A1 * | 9/2020 | Cho | H04M 1/724 | |
| 2020/0379411 A1 * | 12/2020 | Watanabe | G04G 21/04 | |
| 2021/0259049 A1 * | 8/2021 | Matsuoh | H04B 1/385 | |

FOREIGN PATENT DOCUMENTS

| | | | | |
|---|---|---|---|---|
| JP | 2007057274 A | | 3/2007 | |
| JP | 5347814 B2 | | 11/2013 | |
| JP | 2016520822 A | | 7/2016 | |
| JP | 2018-022223 A | | 2/2018 | |
| WO | WO-2019172844 A1 * | 9/2019 | | G01C 21/3632 |

OTHER PUBLICATIONS

Genichiro Ohashi et al. "Innermost Secrets for Automation of Personal Computers, To save time required for routine work instantly", Nikkei Personal Computing, No. 708, Oct. 27, 2014, pp. 44-45.

Communication dated Nov. 4, 2020, from the Japanese Patent Office in application No. 2019-147136.

* cited by examiner

MOBILE DEVICE AND MOBILE DEVICE SYSTEM

CROSS-REFERENCE TO RELATED APPLICATION(S)

The present application claims priority to and incorporates by reference the entire contents of Japanese Patent Application No. 2019-043026 filed in Japan on Mar. 8, 2019 and Japanese Patent Application No. 2019-147136 filed in Japan on Aug. 9, 2019.

BACKGROUND OF THE INVENTION

1. Field of the Invention

The present invention relates to a mobile device and a mobile device system.

2. Description of the Related Art

Conventionally, there have been electronic watches that operate based on a control program stored in advance. In Japanese Patent No. 5347814, disclosed is an electronic watch including a controller that performs overall control of the device and a ROM as a setting-value storage unit in which a control program that a CPU of the controller executes and control data are stored.

There have also been electronic devices that have enhanced functionality such as having a function of cooperating with a mobile terminal. In Japanese Patent Application Laid-open No. 2018-22223, disclosed is an electronic watch having an e-mail receiving display that notifies the mobile device that an e-mail has been received and an incoming call display that notifies the mobile device that there has been an incoming call.

When providing a lot of functions to a user, it is conceivable that all the functions be kept stored in the mobile device in advance. However, trying to keep a lot of functions stored increases the amount of memory needed and leads to an increase in the size of the mobile device.

SUMMARY OF THE INVENTION

The present invention has been made in view of the above circumstance, and an object is to provide a mobile device and a mobile device system that can provide enhanced functionality to user and suppress an increase in size of the mobile device.

According to one aspect of the present invention, a mobile device includes a drive unit for which correspondence between a command that is input and a drive signal that is output to an operation unit is predetermined; and a controller configured to output the command to the drive unit and cause the operation unit to operate, wherein the controller includes a storage unit configured to store a user program including script language and outputs the command in accordance with the user program.

According to another aspect of the present invention, a mobile device system includes an application executed in a mobile communication device and configured to generate a user program including script language; and a mobile device, wherein the mobile device includes a communication unit configured to perform wireless communication with the mobile communication device, a drive unit for which correspondence between a command that is input and a drive signal that is output to an operation unit is predetermined, and a controller that includes a storage unit storing therein the user program acquired by wireless communication with the mobile communication device and is configured to output the command to the drive unit in accordance with the user program and cause the operation unit to operate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes in detail a mobile device and a mobile device system according to an exemplary embodiment of the present invention with reference to the accompanying drawings. The invention, however, is not intended to be limited by the embodiment. The constituent elements in the following embodiment include elements easily achieved by a person skilled in the art or elements being substantially the same as the constituent elements.

Embodiment

In the present embodiment, an electronic watch 1 that is one example of the mobile device will be described. In the present embodiment, as one example of the mobile device system, a mobile device system 10 that includes the electronic watch 1 and an application 60 will be further described.

Figure 1:
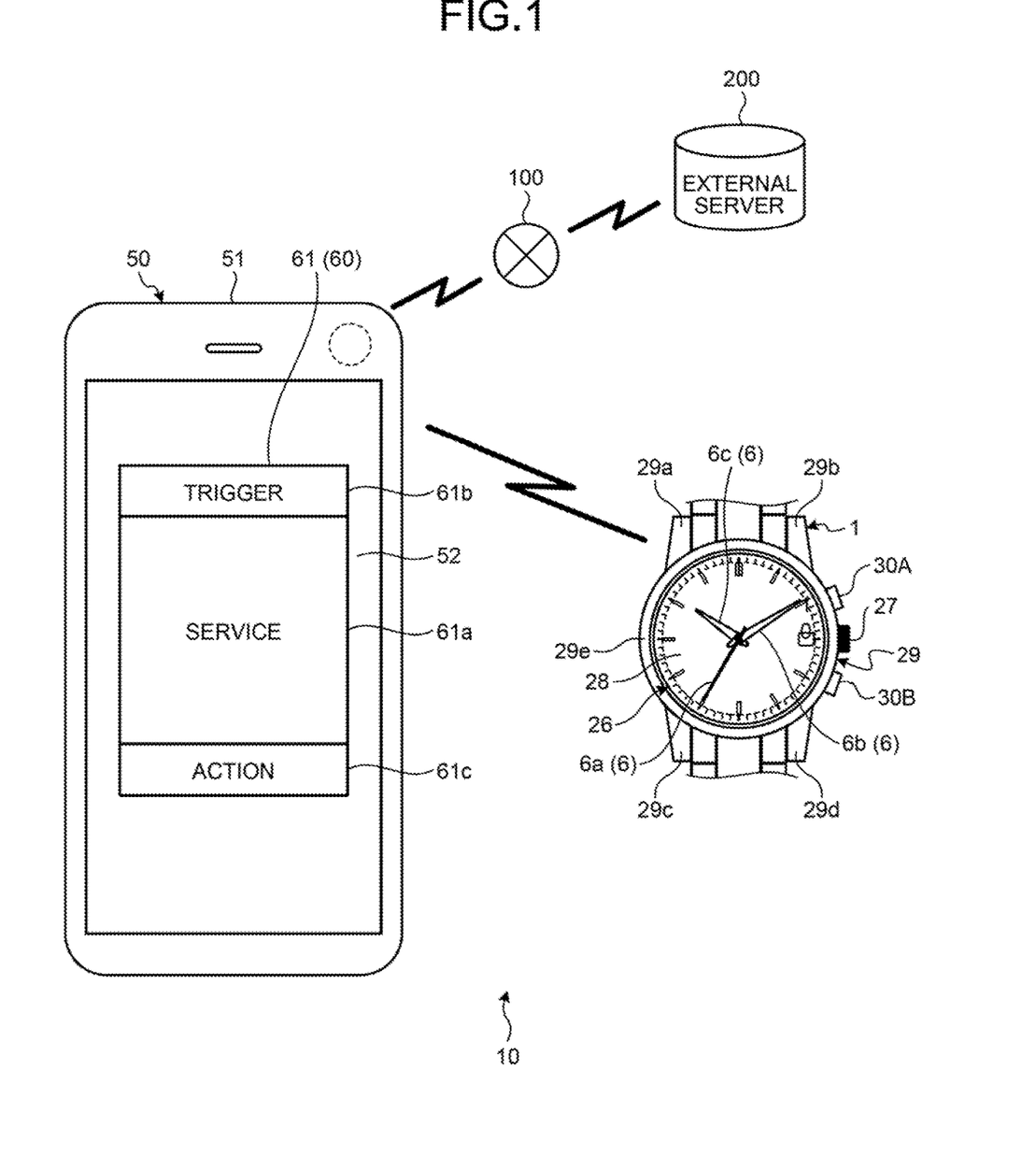
FIG. 1 is a diagram illustrating a mobile device system according to an embodiment.

As illustrated in FIG. 1, the mobile device system 10 includes the electronic watch 1 and the application 60. The electronic watch 1 has an analog display unit 26 and an exterior case 29.

The analog display unit 26 is accommodated in the internal space of a case body 29*e*. The analog display unit 26 includes hands 6 and a dial 28. The hands 6 include a second hand 6*a*, a minute hand 6*b*, and an hour hand 6*c*. On the case body 29*e*, a crown 27, a first button 30A, and a second button 30B are arranged.

A mobile communication device 50 is a device that a user of the electronic watch 1 owns and is used by the user. The mobile communication device 50 is typically a mobile terminal device such as a smartphone. The mobile communication device 50 has a function of performing near field communication. The mobile communication device 50 further has a function of performing communication with an external server 200 via an internet network 100. The mobile communication device 50 has a housing 51 and a touch panel 52. The touch panel 52 is overlaid on an image display surface. On the image display surface, a user interface 61 of the application 60 is displayed. The user is able to operate the mobile communication device 50 via the input operation to the touch panel 52.

Figure 2:
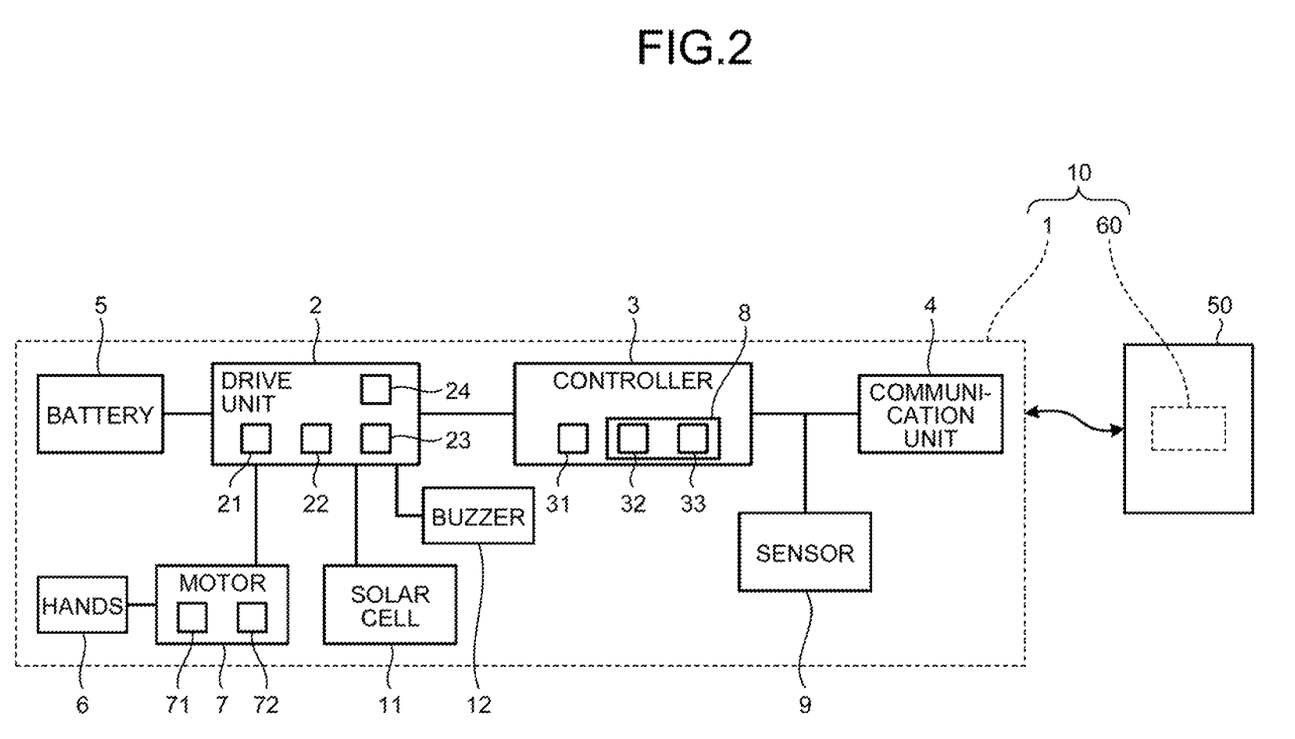
FIG. 2 is a block diagram of the mobile device system according to the embodiment.

As illustrated in FIG. 2, the electronic watch 1 includes a drive unit 2, a controller 3, a communication unit 4, a battery 5, the hands 6, a motor 7, a sensor 9, a solar cell 11, and a buzzer 12. The electronic watch 1 of the present embodiment is an analog electronic watch that displays the time by the hands 6. The electronic watch 1 may have a digital display unit that displays the time.

The battery 5 is a power source of the electronic watch 1, and is a rechargeable secondary battery, for example. The battery 5 supplies electric power to various units including the drive unit 2, the controller 3, and the communication unit 4. The hands 6 are coupled to the motor 7 via train wheels and the like. Thus, the hands 6 rotate in conjunction with the rotation of the motor 7.

The motor 7 is a drive source that rotates the hands 6, and is an electromagnetic motor or electrostatic motor, for example. The motor 7 of the present embodiment includes a first motor 71 coupled to the second hand 6a and a second motor 72 coupled to the minute hand 6b and the hour hand 6c. In the electronic watch 1 of the present embodiment, the hand movement of the second hand 6a and the hand movement of the minute hand 6b and the hour hand 6c are independent. That is, the electronic watch 1 of the present embodiment is configured such that the second hand 6a can be made to perform various movements while displaying the current time with the minute hand 6b and the hour hand 6c.

The sensor 9 is a sensor that acquires information concerning the electronic watch 1. Examples of the sensor 9 include a temperature sensor that measures the internal temperature of the electronic watch 1, an acceleration sensor that measures the acceleration of the electronic watch 1, a tilt sensor that detects changes in the tilt angle of the electronic watch 1, a light sensor that detects the intensity of light that the solar cell 11 receives, and the like. The detection result by the sensor 9 is acquired by the controller 3 and the drive unit 2.

The solar cell 11 is a photovoltaic mechanism that converts light energy into electrical energy. The solar cell 11 is arranged on the back surface side with respect to the dial 28, for example. The electric power generated by the solar cell 11 is charged into the battery 5, and the electric power is supplied to various units of the electronic watch 1 such as the drive unit 2, the controller 3, and the motor 7, via the battery 5.

The buzzer 12 is a rumbling mechanism that produces a buzzer sound. The buzzer 12 includes, for example, a piezoelectric device such as a piezoelectric element and generates the buzzer sound by the vibration of the piezoelectric device. The piezoelectric device vibrates in response to the changes in the voltage supplied, thereby generating the buzzer sound that indicates an alarm.

The drive unit 2 drives an operation unit installed on the mobile device. In the case where the mobile device is the electronic watch 1, the drive unit 2 is a clock IC, for example. In the electronic watch 1 of the present embodiment, the operation unit that is driven by the drive unit 2 includes the motor 7 and the buzzer 12.

The drive unit 2 includes a motor drive circuit 21, a power-supply managing unit 22, a buzzer drive circuit 23, and a timer 24. The motor drive circuit 21 is a circuit that drives the motor 7. The motor drive circuit 21 outputs, in response to a command input from the controller 3, drive signals to the motor 7. In the electronic watch 1 of the present embodiment, the correspondence between the command that is input to the drive unit 2 and the drive signal that the drive unit 2 outputs to the second motor 72 is predetermined. That is, the user is not able to customize the correspondence between an input command to the drive unit 2 and the drive signal that the drive unit 2 outputs in response to the relevant input command. In other words, the drive unit 2 is configured to execute the same operation with respect to the same input command. In the case where the firmware is updated, the correspondence between the input command and the drive signal to be output may be changed.

The power-supply managing unit 22 manages the charging and discharging of the battery 5. For example, the power-supply managing unit 22 controls the supply of electric power to the drive unit 2 and the controller 3 from the battery 5. The power-supply managing unit 22 further manages the charging from the solar cell 11 to the battery 5. The power-supply managing unit 22 is further coupled to a voltage detection circuit that detects the voltage of the battery 5. The drive unit 2 selects an operation mode of the electronic watch 1 according to the voltage of the battery 5 (hereinafter simply referred to as a "battery voltage"). For example, when the battery voltage drops, the drive unit 2 shifts the mode of the electronic watch 1 to a power-save mode or a power-break mode. The power-save mode is a mode that suppresses dropping of the battery voltage, by stopping the moving of the hands 6 and the like. The power-break mode is a mode that stops the operation of the drive unit 2 and the controller 3. The determination and the command of mode shift may be made by the controller 3.

The buzzer drive circuit 23 is a circuit that outputs a drive signal to the buzzer 12. The buzzer drive circuit 23 outputs, based on the command output to the drive unit 2 from the controller 3, the drive signal to the buzzer 12. The correspondence between the command that is input to the drive unit 2 and the drive signal that the buzzer drive circuit 23 outputs to the buzzer 12 in response to the relevant command is predetermined.

The drive unit 2 is configured to cause the buzzer 12 to rumble with a predetermined finite number of rumble patterns. For example, it is assumed that the drive unit 2 is configured to cause the buzzer 12 to rumble with either a first rumble pattern or a second rumble pattern. In this case, the buzzer command that is output to the drive unit 2 from the controller 3 includes information specifying by which of the two rumble patterns the buzzer 12 rumbles. The buzzer drive circuit 23 outputs to the buzzer 12 the drive signal corresponding to the specified rumble pattern.

The timer 24 counts the elapsed time on the basis of a clock signal output from an oscillation circuit and the like. The drive unit 2 outputs, in response to a command input from the controller 3, a drive signal to the timer 24. The drive signal to the timer 24 includes a signal that specifies the timer time and a signal that commands the start of the count. The drive unit 2 utilizes the timer 24 and performs various operations.

The communication unit 4 includes an antenna, a communication module, and a converter, for example. The communication unit 4 performs near field communication with the mobile communication device 50. The communication unit 4 performs communication with the mobile communication device 50 via the protocol of Bluetooth (registered trademark), for example.

The controller 3 is, for example, a microcomputer and includes an arithmetic unit 31 and a memory 8. The memory 8 includes a random access memory (RAM) 32, and a read-only memory (ROM) 33. The RAM 32 is, for example, a flash memory, an EEPROM, and the like and is used as a work memory of the arithmetic unit 31. Furthermore, the RAM 32 can be used as the ROM 33, and a pre-stored operation sequence and information may be recorded.

Figure 3:
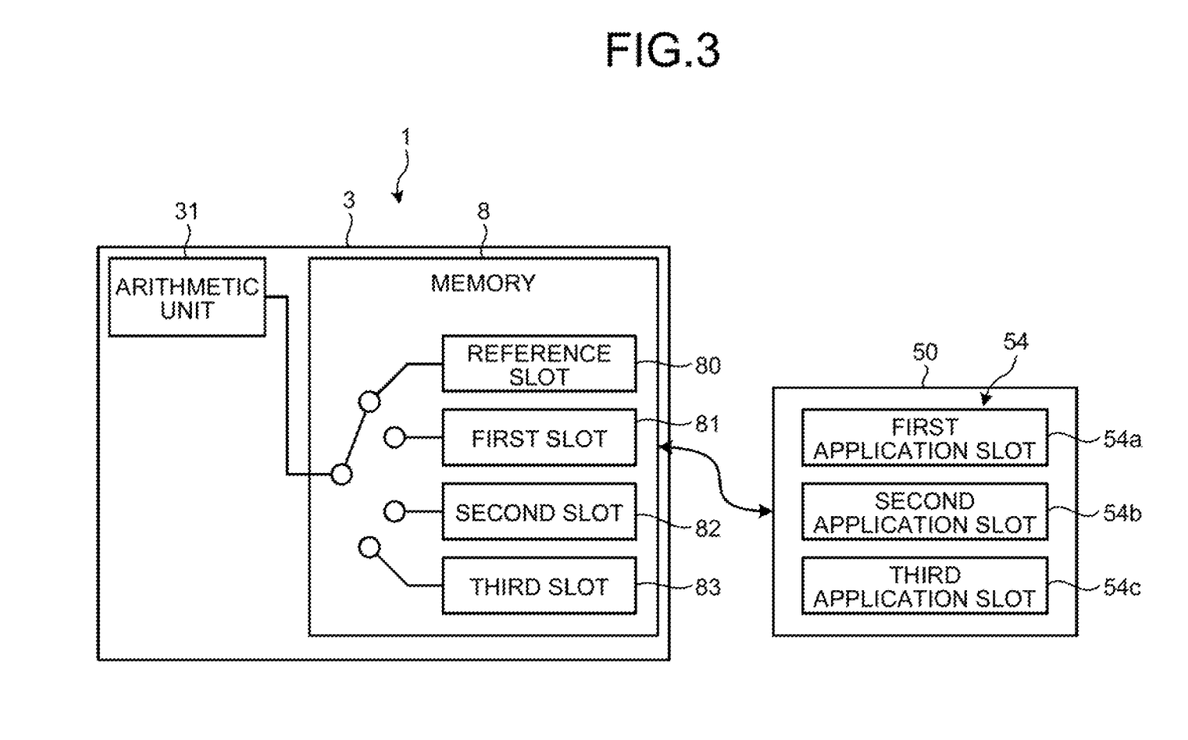
FIG. 3 is a diagram for explaining slots according to the embodiment.

As illustrated in FIG. 3, the memory 8 includes a plurality of slots 80, 81, 82, and 83. More specifically, the memory 8 includes the reference slot 80, the first slot 81, the second slot 82, and the third slot 83. The slots 80, 81, 82, and 83 are storage areas constituting the RAM 32, for example. The slot 80 is a storage area that stores therein a computer program (hereinafter simply referred to as a "main program") that performs the clock operation corresponding to normal operation. The main program includes a clocking program that calculates internal time; a power-supply control program that controls the charging and discharging of the battery 5; a motor control program that performs drive control of the motor 7; a distribution program that charges the electric power generated by the solar cell 11 to the battery 5 and distributes the electric power to various units of the electronic watch 1 such as the drive unit 2, the controller 3, the motor 7, and the like via the battery 5; and the like.

The main program is a computer program of machine language, for example. The main program may be a computer program corresponding to the type (caliber) of the electronic watch 1 or may be a computer program common to a plurality of types. The main program of the present embodiment is a computer program common to a plurality of types. The main program is created in C language and is assembled into the machine language, for example. In the electronic watch 1 of the present embodiment, the main program is not allowed to be customized by the user. In the electronic watch 1, the change of the main program by firmware update is permitted. The firmware update is an update of the main program that is provided by the manufacturer of the electronic watch 1.

The first slot 81, the second slot 82, and the third slot 83 are storage areas to store user programs. The user program is a computer program created by the user and is described in script language. In the mobile device system 10 of the present embodiment, the user program can be transferred to the electronic watch 1 from the mobile communication device 50. The detail of the user program will be described later. The electronic watch 1 is configured to execute any one of the programs of the reference slot 80, the first slot 81, the second slot 82, and the third slot 83, for example.

In the following description, the user program stored in the first slot 81 is referred to as a "first user program". Similarly, the user program stored in the second slot 82 is referred to as a "second user program" and the user program stored in the third slot 83 is referred to as a "third user program". The mode in which the electronic watch 1 is controlled based on the main program is referred to as a main mode.

The controller 3, in the main mode, outputs commands to the drive unit 2 on the basis of the main program. For example, the controller 3 outputs to the drive unit 2 a command that moves the minute hand 6b and hour hand 6c on the basis of the internal time. The drive unit 2 that has received this command drives the second motor 72 so that the rotational positions of the minute hand 6b and the hour hand 6c are at the positions corresponding to the internal time.

In the main mode, the controller 3 outputs to the drive unit 2 a command that moves the second hand 6a on the basis of the internal time. The drive unit 2 that has received this command moves the second hand 6a by the first motor 71. The drive unit 2 may drive the first motor 71 so as to intermittently move the second hand 6a by what is called one-second movement or may drive the first motor 71 so as to rotate the second hand 6a continuously.

In the main mode, the controller 3 outputs commands to the power-supply managing unit 22 on the basis of the main program. The power-supply managing unit 22 outputs, in response to the command from the controller 3, a drive signal that controls the charging and discharging of the battery 5. The controller 3 further outputs commands concerning the buzzer to the drive unit 2 on the basis of the main program. For example, the main program outputs, based on the operation of the user on the first button 30A and the second button 30B, a command that causes the buzzer 12 to rumble at the specified time to the drive unit 2. The drive unit 2, in response to the command, outputs a drive signal to the buzzer 12 from the buzzer drive circuit 23 at the specified time and causes the buzzer 12 to rumble.

In the electronic watch 1 thus configured, the controller 3 commands the clock operation corresponding to the normal operation to the drive unit 2, in accordance with the main program stored in the reference slot 80 of the memory 8. The controller 3 further executes any of the first user program, the second user program, and the third user program, in response to a program execution command from the user. In the electronic watch 1 of the present embodiment, as will be described in the following, the user program is created in the mobile communication device 50. Furthermore, the user program created in the mobile communication device 50 is transmitted to the electronic watch 1 and stored in any of the slots 81, 82, and 83 of the memory 8.

The user program is created by the application 60 executed in the mobile communication device 50. The user program is an application program executed in the electronic watch 1 and is also referred to as an applet. The application 60, as illustrated in FIG. 1, displays the user interface 61 for creating the user program. The user interface 61 is for inputting service content to be provided, an action to be performed on the electronic watch 1, and a trigger condition to execute the action. The user interface 61 includes a service selection area 61a, a trigger selection area 61b, and an action selection area 61c.

The service selection area 61a is an area for selecting the service content that the user desires to receive from the user program to create. Examples of the service include the service that the electronic watch 1 singly provides and the service that the electronic watch 1 and the mobile communication device 50 collaboratively provide. For example, the application 60 of the present embodiment creates a distance guidance service that informs the user of the distance to a destination that the user specifies. The destination may be a store such as a café, for example. The user, when creating the distance guidance service, selects the distance guidance service from the service selection area 61a.

The trigger selection area 61b is an area for selecting a trigger condition. The trigger condition is a condition to perform the action corresponding to the selected service. As the trigger condition, the operating input of the user on the electronic watch 1, the start time, the internal information on the electronic watch 1, and the like are selectable. Examples of the operating input include push operation on the first button 30A and the second button 30B. Examples of the internal information on the electronic watch 1 include information detected by the sensor 9 and the data calculated based on this information. For example, detecting temperature higher than a predetermined temperature by the temperature sensor may be the trigger condition. Alternatively, in the case where the activity data of the user is calculated based on the detection results of the acceleration sensor and the tilt sensor in the electronic watch 1, the fact that the activity data satisfies a predetermined condition may be the trigger condition. For example, the fact that the calculated number of steps reached a predetermined number of steps may be the trigger condition.

The action selection area 61c is an area for selecting the action performed in the electronic watch 1. In the electronic watch 1 of the present embodiment, the information on the battery 5, the operation of the hands, the operation of the timer 24, and the operation of the buzzer 12 are open to the user. The user can customize the operating condition of the second hand 6a and customize the operating condition of the buzzer 12. The user can further create a user program by utilizing the information on the battery 5, and the count by the timer 24.

Figure 4:
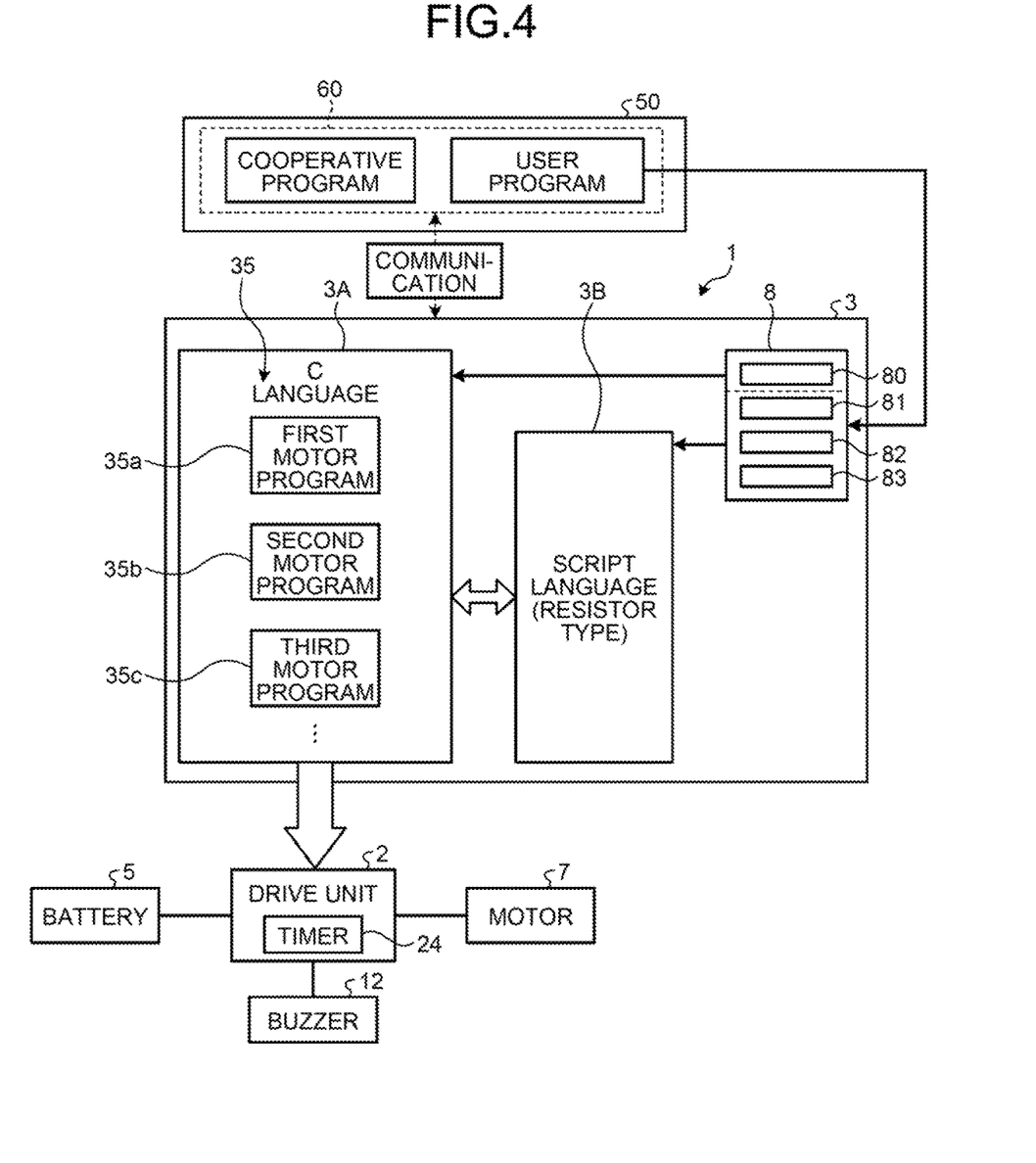
FIG. 4 is a diagram illustrating a principal portion of the mobile device system according to the embodiment.

As illustrated in FIG. 4, the controller 3 includes a script engine 3B and can execute the user program created in script language. That is, the controller 3 can perform the drive in accordance with the user program when the slot of the watch is changed from the reference slot that is controlled by the main program of the machine language to the slot in which the user program including script language is stored. In this case, because a drive program 35 is in the machine language as will be described later, the user program is reflected in the drive program 35 by using the script engine 3B. Then, by executing the drive program 35 in which the user program has been reflected and outputting a command to the drive unit 2, it is possible to switch to the operation by the user program from the normal operation that has been performed by the main program. The script language is a resistor-type script language such as Lua, for example.

In the present embodiment, the user program created in the mobile communication device 50 is text data written in JavaScript Object Notation (JSON), and expressions that function as script languages are included therein. The user program is transmitted to the electronic watch 1 from the mobile communication device 50 and is stored in the memory 8.

Only the content concerning the processing of the electronic watch 1 out of the user program may be transmitted to the electronic watch 1. In that case, the processing not related to the electronic watch 1 may be executed by the mobile communication device 50.

The controller 3 stores therein various drive programs 35 for driving the operation units such as the battery 5, the motor 7, the buzzer 12, the timer 24, and the like. The drive programs 35 include programs of the functions concerning the operation control of the watch such as the first button 30A, the second button 30B, the crown 27, and the like. The drive programs 35 are created according to the type (caliber) of the electronic watch 1. That is, the drive programs 35 are programs created so as to suit the type of the movement installed on the electronic watch 1. The drive programs 35 are coded for each watch as a static function module. Meanwhile, the user program is a dynamic function module that causes the electronic watch 1 to perform the operation that the user desires.

For example, as illustrated in FIG. 4, the controller 3 stores therein a first motor program 35a, a second motor program 35b, and a third motor program 35c. The first motor program 35a, the second motor program 35b, and the third motor program 35c are each a computer program that causes the motor 7 to perform the operation. The three motor programs 35a, 35b, and 35c define different operations from one another. The motor drive information for the motor programs 35a, 35b, and 35c to drive the motor 7 is the frequency of drive pulses, the duty, the number of pulses, the number of steps, the rotational direction, and the like, for example.

The main program and the user programs executed in the controller 3 call the drive program 35, thereby sending a command to the drive unit 2. For example, when the first motor program 35a is called, a command is sent to the drive unit 2 from the controller 3, so as to cause the motor 7 to perform the operation defined in the first motor program 35a. The controller 3 stores therein in advance the correspondence between a code of the operation command that the application 60 generates and the drive program 35 that corresponds to this operation command. This correspondence is defined in advance according to the type of the electronic watch 1. The controller 3, when executing the main program and the user programs, refers to the above-described correspondence and outputs commands to the drive unit 2.

The drive unit 2 outputs the drive signal corresponding to the received command to the operation unit such as the motor 7 and causes the operation unit to operate. For example, it is assumed that the first motor program 35a is a computer program that causes the second hand 6a to perform one-second movement. In this case, when the first motor program 35a is called by the program executed in the controller 3, the command that causes the second hand 6a to perform one-second movement is output to the drive unit 2 from the controller 3. The drive unit 2 outputs the drive signal that causes the second hand 6a to perform one-second movement to the motor 7. The drive unit 2 keeps causing the second hand 6a to perform one-second movement until a command that changes the operation of the second hand 6a is received.

The application 60 of the mobile communication device 50 generates the user programs on the basis of the drive programs 35 that are open to the user. In the following description, a user program that provides the above-described distance guidance service is referred to as a "distance guidance program". The application 60, when the trigger condition selected in the trigger selection area 61b is satisfied, generates the distance guidance program that executes the service selected in the service selection area 61a and performs the execution result of the service in the action selected in the action selection area 61c. The distance guidance program includes a trigger block that determines whether the trigger condition has been satisfied, a service block that performs the service, and an action block that performs the action. The action block includes a calling code that calls the drive program 35.

The following illustrates a specific example of the distance guidance service.

The trigger block determines that the user has pressed the push button of the electronic watch 1, and the trigger condition is satisfied.

When the trigger condition is satisfied, the service block obtains the remaining distance from the current location of the user and the location of the destination, and acquires the value thereof from the server.

The action block lets the drive program 35 recognize the distance from the current location of the user to the destination acquired by the service block and expresses the distance with the predetermined control using the hands.

The application 60 generates a program assembly in which the user program and a cooperative program which will be described later are included. The cooperative program is a computer program that cooperates with the user program and is executed in the mobile communication device 50. The program assembly can include a plurality of blocks. For example, the program assembly may be made up of one trigger block, one service block, and one action block. The program assembly of the present embodiment is generated by the combination of any desired number of trigger blocks, any desired number of service blocks, and any desired number of action blocks. In this case, any desired number includes zero.

The application 60 embeds in the block the script to be inserted into the memory 8 of the electronic watch 1. That is, the block generated by the application 60 is a block program for which the script executed in the electronic watch 1 and the cooperative program executed in the mobile communication device 50 are combined. For example, in the case where each block is text data described in json, application 60 makes the script included in the block as one of the data. That is, the text of the script is described into the block as a single character string value. In this case, the data including the script is given a unique tag.

The script concerning the action performed in the electronic watch 1 is described in the action block, and the script concerning the trigger generated in the electronic watch 1 is described in the trigger block. When there is a service performed in the electronic watch 1, the script concerning that service is described in the service block. The application 60 stores the program assembly including the generated block program in the memory of the mobile communication device 50 or in the external server 200.

In the following description, the script concerning the trigger generated in the electronic watch 1 is referred to as a "trigger script". Similarly, the script concerning the service that the electronic watch 1 performs is referred to as a "service script", and the script concerning the action that the electronic watch 1 performs is referred to as an "action script".

The application 60 extracts the script from each block included in the program assembly when transmitting the user program to the electronic watch 1. The application 60 couples the script extracted from each block and generates a single user script. For example, when the program assembly includes a trigger block, a service block, and an action block, the trigger script, the service script, and the action script are coupled, and one user script is generated. The user script that has been generated is the user program executed in the electronic watch 1. The application 60 transmits the generated user script to the electronic watch 1.

The application 60 may generate the user program corresponding to the type (caliber) of the electronic watch 1 with which pairing has been done, or may create the program common to a plurality of types. The application 60 of the present embodiment creates the user program common to the multiple types.

The application 60, when creating the user program corresponding to the individual type, acquires in advance the information on the type of the electronic watch 1 and the drive program 35 that corresponds to that type. The information on the drive program 35 available in each type is acquired from the external server 200, for example. The application 60 further acquires in advance, based on the type, the information on the sensor 9 installed on the electronic watch 1 and the information on the event generated in the electronic watch 1. The application 60 generates the user program on the basis of the acquired information.

It is assumed that the trigger condition selected by the user is a predetermined push operation to the first button 30A and the selected action is the operation of rotating the second hand 6a the number of times according to the distance. In this case, the application 60 generates the distance guidance program that rotates the second hand 6a the number of times according to the distance when the predetermined push operation is detected. The number of rotations of the second hand 6a may be instructed to the electronic watch 1 from the application 60. In this case, in the mobile communication device 50, the cooperative program that cooperates with the distance guidance program is executed. The application 60 generates the cooperative program together with the distance guidance program.

The cooperative program is stored in application slots 54 (see FIG. 3) that the mobile communication device 50 includes. The mobile communication device 50 has a plurality of application slots 54 from a first application slot 54a to a third application slot 54c. The first application slot 54a is a storage area corresponding to the first slot 81 of the memory 8. Similarly, the second application slot 54b and the third application slot 54c are storage areas corresponding to the second slot 82 and the third slot 83, respectively. When the distance guidance program is stored in the first slot 81, the cooperative program that cooperates with the distance guidance program is stored in the first application slot 54a. When the distance guidance program is executed in the electronic watch 1, in the mobile communication device 50, the cooperative program is read out from the first application slot 54a and executed.

The distance guidance program acquires, by wireless communication with the mobile communication device 50, the information on the target number of rotations of the second hand 6a. The cooperative program calculates, in response to the information request from the electronic watch 1, the distance from the current location to the specified store. The distance calculated may be a linear distance or may be the distance along the shortest path to the store. The current location of the mobile communication device 50 is calculated based on GPS radio waves output from a global positioning system (GPS) satellite, for example. The cooperative program determines, based on the calculated distance, the target number of rotations of the second hand 6a and transmits it to the electronic watch 1. The distance guidance program may, from the cooperative program, regularly request the information on the target number of rotations, or may request the information when the defined trigger condition is satisfied.

The created distance guidance program is transmitted to the electronic watch 1 from the mobile communication device 50 by wireless communication. The application 60 selects, out of the first slot 81 to the third slot 83 that the electronic watch 1 includes, which slot to store the distance guidance program in. Consequently, the mobile communication device 50 transmits to the electronic watch 1 the distance guidance program and the slot number into which the distance guidance program is to be stored. It is assumed that the specified slot of the storage destination is the first slot 81. In this case, the controller 3 stores the received distance guidance program in the first slot 81. The application 60 further stores in the first application slot 54a the cooperative program that cooperates with the distance guidance program.

The application 60 performs synchronization of user programs, when the wireless communication between the mobile communication device 50 and the electronic watch 1 is established, for example. The synchronization of user programs is performed, for example, when the user program is changed, when the user program is newly created, and when the user programs are switched. The application 60, when performing the synchronization of user programs, transmits to the electronic watch 1 the updating user program or the newly created user program. The controller 3 stores the received user program in the specified slot 81, 82, or 83.

When the user executes the distance guidance program, the user performs, by the operation on the electronic watch 1 or the operation on the mobile communication device 50, a program execution command for executing the distance guidance program. When the distance guidance program is executed by the operating input to the electronic watch 1, the electronic watch 1 requests, via wireless communication, the mobile communication device 50 to execute the cooperative program. Meanwhile, when the distance guidance program is executed by the operation in the mobile communication device 50, the mobile communication device 50 requests the electronic watch 1 to execute the distance guidance program and also reads out and executes the cooperative program.

The controller 3, upon receiving the program execution command, reads out and executes the distance guidance program from the first slot 81. At this time, the controller 3 may store the read distance guidance program in the RAM 32. When the distance guidance program is executed, the drive unit 2 may cause the second hand 6a to perform normal hand movement until the command for changing the operation of the second hand 6a is made. That is, until the trigger condition of the distance guidance program is satisfied, the second hand 6a may be moved so as to indicate the internal time.

The distance guidance program, when the trigger condition is satisfied, executes the service selected in the service selection area 61a and, after receiving the execution result of the service, calls the drive program 35 for executing the action selected in the action selection area 61c. For example, it is assumed that, in the controller 3, a computer program that causes, as the second motor program 35b, the second hand 6a to rotate with 360 degrees as a unit is stored. In this case, the distance guidance program calls the second motor program 35b and rotates the second hand 6a only by the target number of rotations. For example, when the target number of rotations are three rotations, the distance guidance program calls the second motor program 35b with the argument of three units. As a result, a command that causes the second hand 6a to make three rotations is output, from the controller 3 to the drive unit 2. The drive unit 2 outputs to the motor 7 a drive signal that causes the second hand 6a to make three rotations.

The starting point of the rotation start in the second motor program 35b may be defined as the position of 12 o'clock, for example. In this case, the drive unit 2 causes the second hand 6a to make three rotations, after moving the second hand 6a to the position of 12 o'clock.

Figure 5:
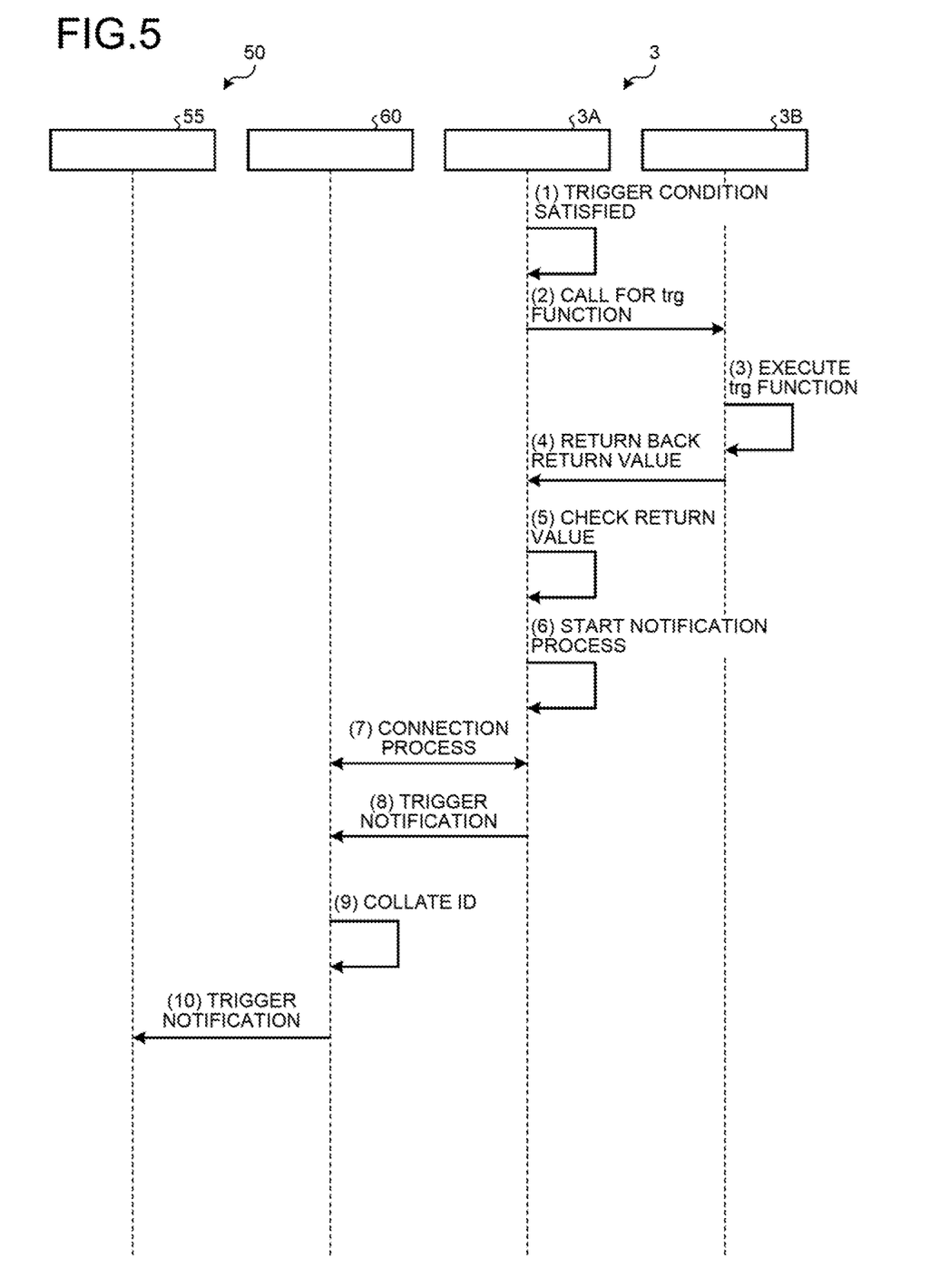
FIG. 5 is a diagram illustrating an operation example of a trigger block according to the embodiment.

With reference to FIG. 5 to FIG. 8, the detail of an operation example in each block of the embodiment will be described. FIG. 5 illustrates an operation example of the trigger block. In the mobile communication device 50, a software development kit (SDK) 55 and the application 60 operate. The SDK 55 is software that is interposed between basic software (OS) of the mobile communication device 50 and the application 60. The SDK 55, upon receiving a use request of hardware resources from the application 60, converts and outputs that the use request into a command for the basic software.

In the controller 3 of the embodiment, a hardware controller 3A and the script engine 3B operate. The hardware controller 3A is a computer program that controls the hardware of the electronic watch 1, and is created in C language, for example. The hardware controller 3A may be a computer program separate from the main program or may be a part of the main program. The script engine 3B is a program that executes the script of the user program. The script engine 3B executes the script while converting it sequentially, for example.

With reference to FIG. 5, an operation example of the trigger block will be described.

(1) The hardware controller 3A detects the satisfying (firing) of the trigger condition. The hardware controller 3A is capable of detecting a plurality of types of triggers. One of the detectable triggers is the fact that the first button 30A or the second button 30B has been pushed, for example. The hardware controller 3A detects, based on a signal indicating that the button 30A or 30B has been pushed, the satisfying of the trigger condition.

(2) The hardware controller 3A calls for a trg function of the trigger script to the script engine 3B. The argument of the trg function is the number indicating the type of the fired trigger.

(3) The script engine 3B executes the trg function. The trg function compares the number of the trigger that is set in the trigger script executed currently with the argument. The trg function outputs as a return value whether the set number of the trigger matches the number of the fired trigger, and an ID of the currently executed user program. The ID of the user program is the number of the currently active slot.

(4) The script engine 3B returns back the return value of the trg function to the hardware controller 3A.

(5) The hardware controller 3A checks the return value.

(6) The hardware controller 3A starts a notification process when the return value is a value indicating that the trigger numbers match. The notification process is a process of transmitting to the mobile communication device 50 the fact that the trigger condition has been satisfied.

(7) The hardware controller 3A performs a connection process when the connection with the mobile communication device 50 has not been established. When the connection with the mobile communication device 50 has been established already, the connection process is omitted.

(8) The hardware controller 3A notifies, by wireless communication, the application 60 of a trigger notification. The hardware controller 3A notifies the application 60 of the number of the trigger for which the condition has been satisfied and the ID of the user program currently executed.

(9) The application 60 collates the ID of the user program executed in the application 60 with the ID of the cooperative program executed in the electronic watch 1.

(10) The application 60 notifies the SDK 55 of a trigger notification when the IDs match.

In checking the return value at (5), when the return value is a value indicating a mismatch of the trigger numbers, shifting to the notification process at (6) is not done. In this case, the hardware controller 3A is in a standby state of waiting for the satisfying of the trigger condition.

Figure 6:
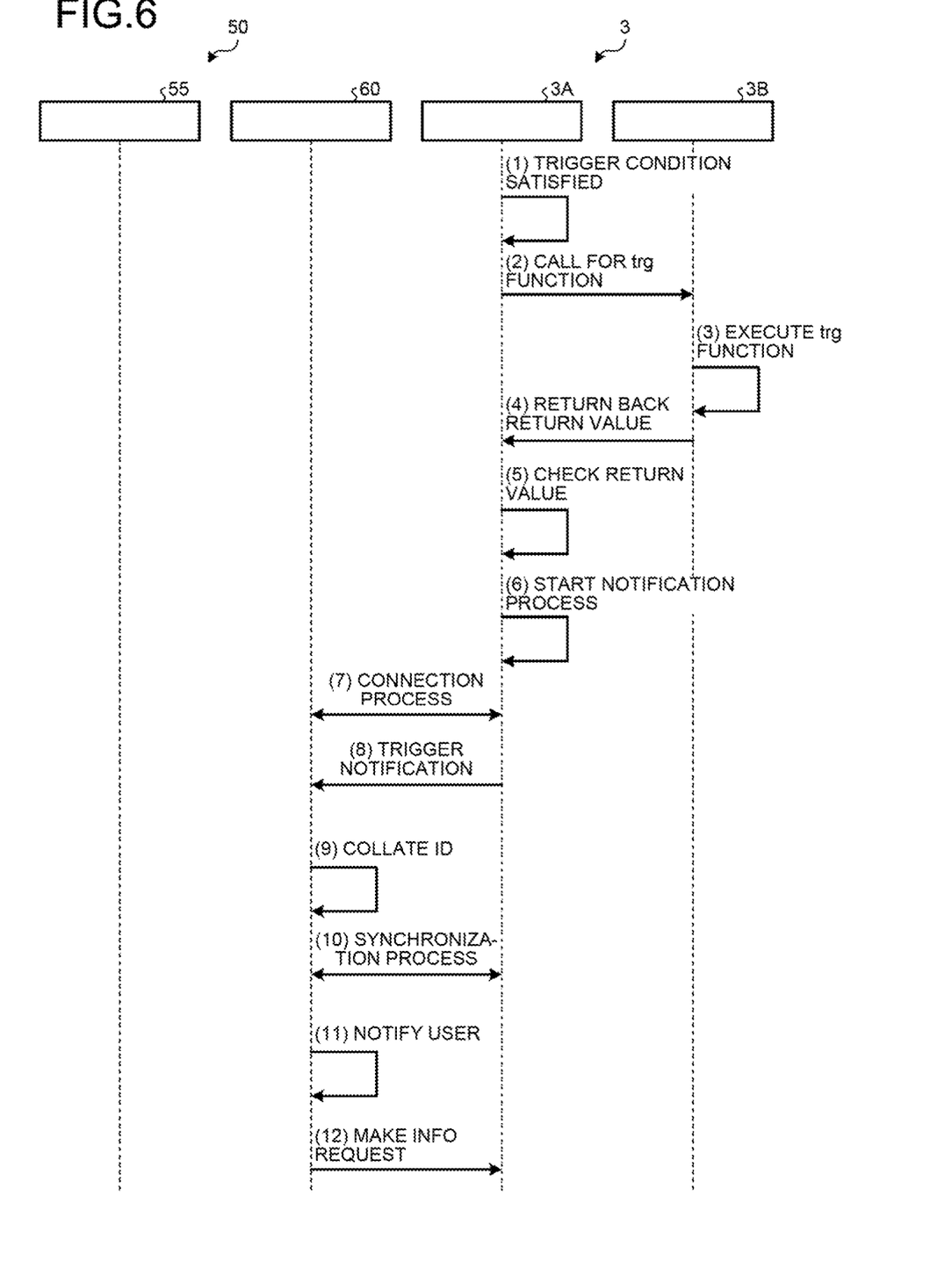
FIG. 6 is another diagram illustrating an operation example of the trigger block according to the embodiment.

As illustrated in FIG. 6, in the ID collation at (9), when the IDs of the user program and the cooperative program did not match, a synchronization process is performed.

(10) In the synchronization process, the application 60 synchronizes the user programs of the electronic watch 1 with the user programs of the application 60. The application 60 transmits the latest user programs to the hardware controller 3A by wireless communication. The hardware controller 3A stores the received user programs in the slots 81, 82, and 83 of the memory 8.

(11) The application 60 notifies the user in a notification center that the user programs have been synchronized. In this notification, it is notified that the user programs set in the application 60 were not reflected in the electronic watch 1 and that the synchronization has been completed.

(12) The application 60 makes an INFO request to the hardware controller 3A. The hardware controller 3A executes an INFO operation in response to the INFO request. The INFO operation is an operation to indicate a predetermined INFO mark by the second hand 6a. The INFO operation is an operation to let the user know that a notice for the user has been sent and prompt checking of the mobile communication device 50.

Figure 7:
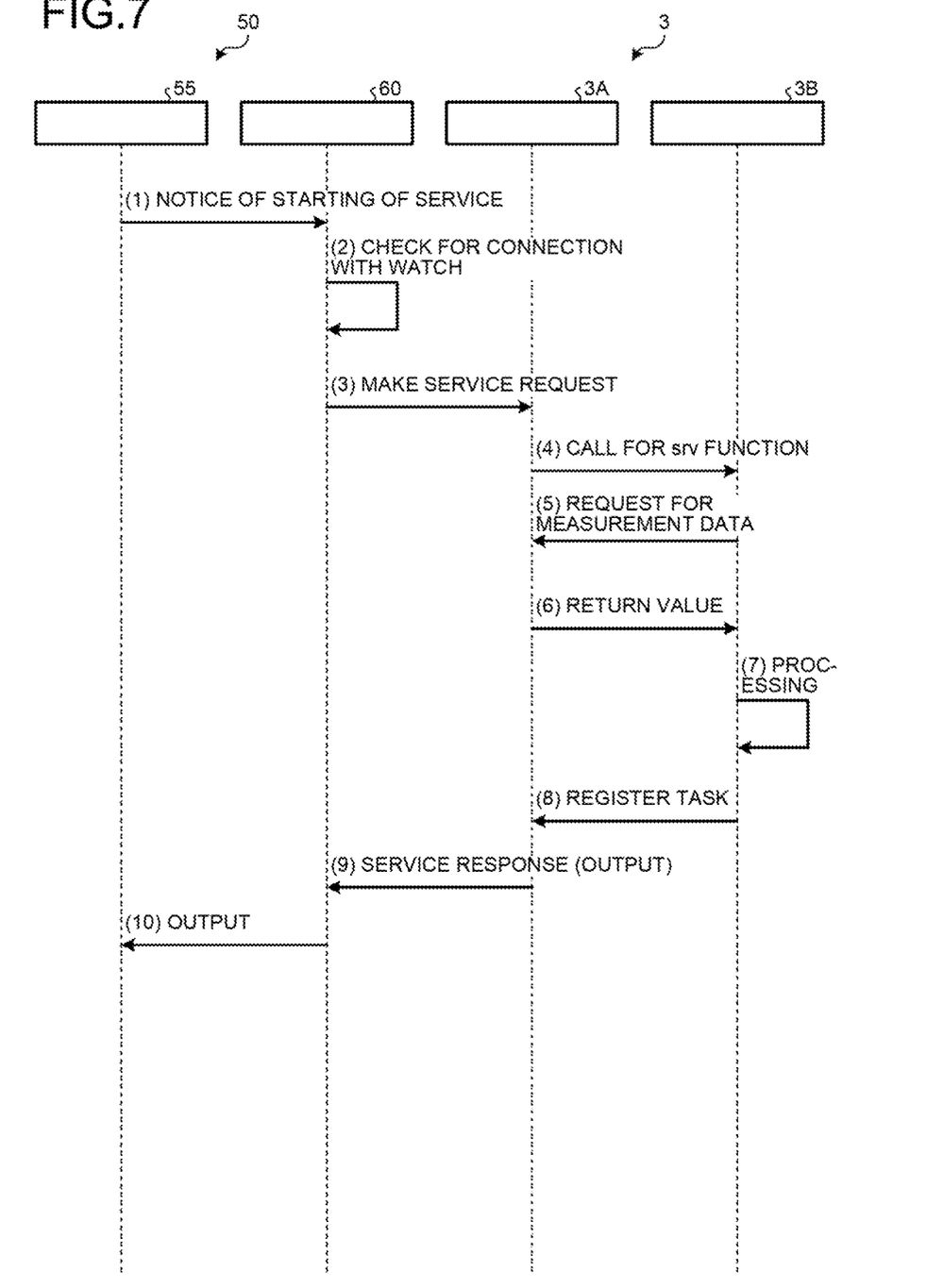
FIG. 7 is a diagram illustrating an operation example of a service block according to the embodiment.

With reference to FIG. 7, an operation example of the service block will be described.

(1) The SDK 55 gives notice of starting of the service. The starting condition of the service is defined in the cooperative program, for example. The application 60 has indicated, based on the cooperative program, to the SDK 55 in advance so as to give notice when the starting condition of the service is satisfied.

(2) The application 60 checks whether the communication with the electronic watch 1 is connected. The application 60 performs a connection process when the communication with the electronic watch 1 is not connected.

(3) The application 60, when the communication is connected, transmits to the hardware controller 3A a service request.

(4) The hardware controller 3A calls for an sry function of the service script to the script engine 3B. The sry function is a function that performs processing based on the information that the electronic watch 1 has, for example.

(5) The script engine 3B requests, in the sry function, measurement data from the hardware controller 3A. The request of measurement data is performed by calling a data request function that is open for the user program. The script engine 3B specifies the type of data to request by the argument of the data request function.

Examples of the available measurement data include the number of steps of the user today, power supply voltage data, consumed calories of the user today, optical data, the current temperature, the second hand position, the minute hand position, the hour hand position, the position of the function hand, and the like. The script engine 3B may acquire a plurality of types of measurement data from the hardware controller 3A.

(6) The hardware controller 3A returns back the requested measurement data to the script engine 3B.

(7) The script engine 3B performs processing based on the acquired measurement data. The script engine 3B may perform arithmetic manipulations based on the measurement data, for example. The script engine 3B may determine the condition based on the measurement data.

(8) The script engine 3B registers a task to the hardware controller 3A. This task is a communication task to deliver a processing result to the application 60.

(9) The hardware controller 3A executes the registered task and performs a service response. In the service response, the processing result of the script engine 3B is transmitted to the application 60.

(10) The application 60 performs output of the service to the SDK 55. For example, the application 60 generates, based on the cooperative program, an output command from the processing result of the script engine 3B. This command is a command to display the consumed calories of the user today on a screen, for example. The SDK 55 performs the service according to the acquired output.

Figure 8:
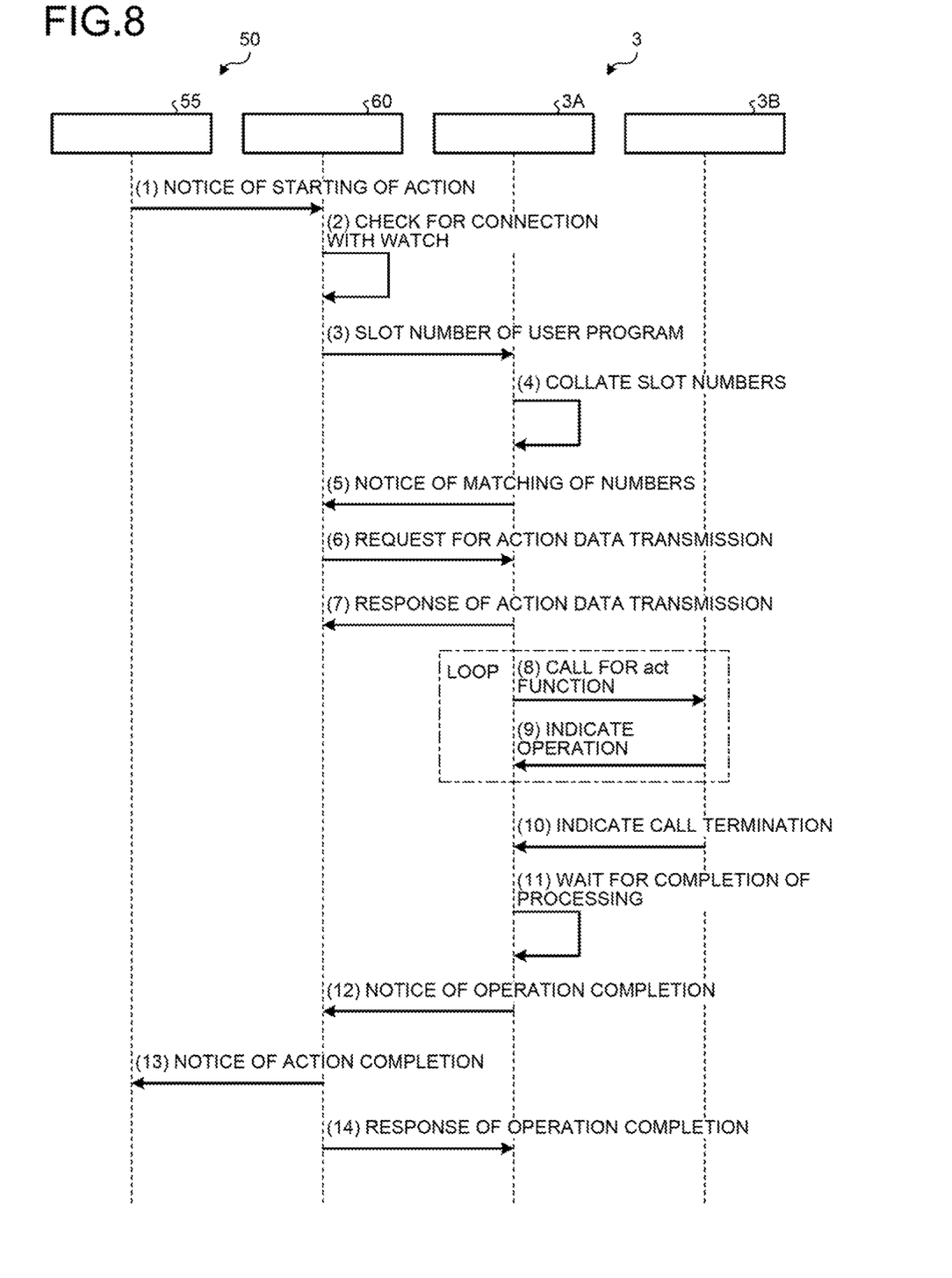
FIG. 8 is a diagram illustrating an operation example of an action block according to the embodiment.

With reference to FIG. 8, an operation example of the action block will be described.

(1) The SDK 55 gives notice of starting of the action. The starting condition of the action is defined in the cooperative program, for example. The application 60 has indicated, based on the cooperative program, to the SDK 55 in advance so as to give notice when the starting condition of the action is satisfied.

(2) The application 60 checks whether the communication with the electronic watch 1 is connected.

(3) The application 60, when the communication is connected, transmits to the hardware controller 3A the slot number of the cooperative program. The application 60 transmits, to the hardware controller 3A, "1" that is the slot number when the cooperative program in the first application slot 54a is executed, for example.

(4) The hardware controller 3A performs the collation of slot numbers. The hardware controller 3A determines whether the slot number of the user program executed in the electronic watch 1 matches the received slot number.

(5) The hardware controller 3A, when two slot numbers match, notifies the application 60 of matching of the numbers.

(6) The application 60 requests the transmission of action data from the hardware controller 3A.

(7) The hardware controller 3A responds to the application 60 that the request for action data has been received.

(8) The hardware controller 3A calls for an act function of the action script to the script engine 3B. The act function is a function that performs the processing concerning the action.

(9) The script engine 3B, when the act function is called, calls for a drive function of the hardware controller 3A and executes event processing. The drive function is a function that indicates the execution of the drive program 35. The script engine 3B can direct, by the drive function, the hand movement operation, the operation of the buzzer 12, a wait operation, the operation of returning to the current time, and the like.

For example, in the hand movement operation, as the hand to operate, the second hand 6a, the minute hand 6b, the hour hand 6c, and the function hand can be specified. In the hand movement operation, the number of steps of the hand movement can be specified at the range of 0 to 360°. In the operation of the buzzer 12, the rumble pattern of the buzzer 12 and the number of times of rumbles can be specified. In the wait operation, the standby time can be specified.

The hardware controller 3A, upon completion of the execution of the indicated drive program 35, calls for the act function to the script engine 3B. The script engine 3B, in accordance with the action script, calls for the drive function that executes the next event. That is, the call for the act function and the call for the drive function are repeated until all events defined in the script are executed.

(10) The script engine 3B indicates, upon calling for the drive function that executes the last event, the termination of the call for the act function to the hardware controller 3A.

(11) The hardware controller 3A, upon receiving the indication of terminating the call, waits for the processing until the last event is completed.

(12) The hardware controller 3A, upon completing the last event, notifies the application 60 of the completion of the operation.

(13) The application 60 notifies the SDK 55 of the end of the action.

(14) The application 60 responds to the hardware controller 3A that the action completion notice has been received.

As in the foregoing, the user program can utilize not only the motor 7 but also the battery 5, the buzzer 12, and the timer 24. For example, in the user program, different operations depending on the voltage of the battery 5 may be set. As one example, the user program may cause the second hand 6a to perform the first operation when the voltage of the battery 5 is at a low level and, when the voltage of the battery 5 is at a high level, may cause the second hand 6a to perform the second operation. The user program can be configured so as to perform different operations depending on various conditions including the battery voltage.

As in the foregoing, the user program can also cause the buzzer 12 to rumble according to the trigger condition and the like. The trigger condition may be set for the detection result of the sensor 9. As one example, the user program may cause the buzzer 12 to rumble when the trigger condition concerning the activity data of the user is satisfied. For example, the user program can also cause the buzzer 12 to rumble when the calculated consumed calories of the user reached a predetermined value.

As in the foregoing, the electronic watch 1 according to the embodiment includes the drive unit 2 and the controller 3 including the memory 8. The electronic watch 1 is one example of a mobile device. In the drive unit 2, the correspondence between the command that is input and the drive signal that is output to the operation unit is predetermined. The drive unit 2 of the present embodiment is a clock IC including a plurality of drive circuits. The memory 8 is a storage unit that stores therein the user program including the script language created by the user. The controller 3 outputs the command in accordance with the user program.

The electronic watch 1 of the present embodiment includes the memory 8 that stores therein the user program. The electronic watch 1 of the present embodiment is configured to be able to store therein the user program and execute it, thereby making it possible to provide enhanced functionality to the user. Furthermore, because there is no need to store a lot of programs in the memory 8 and the like in advance, an increase in the size of the electronic watch 1 is suppressed. In the electronic watch 1 of the present embodiment, because the user program is a computer program including the script language, it can be easily created. For example, the application 60 for generating the user program is simplified. The electronic watch 1 of the present embodiment is configured to be able to form a virtual machine that uses the script language for the clock control program. The virtual machine allows the user to optionally change the function of the electronic watch 1. In addition, the fact that the user program is created in the script language can achieve standardizing of the language to customize the electronic watch 1.

The controller 3 of the present embodiment generates commands by the drive program 35 of the machine language stored in advance. The fact that the drive program 35 is in the machine language alleviates the arithmetic processes of the controller 3 in the execution of the user program.

The controller 3 of the present embodiment outputs commands in accordance with the main program of the machine language in the normal operation. In other words, the drive program 35 of the machine language outputs the commands to the drive unit 2, and the normal operation is performed. The fact that the main program is in the machine language alleviates the arithmetic processes of the controller 3 in the execution of the normal operation.

The controller 3 of the present embodiment includes the hardware controller 3A and the script engine 3B. The controller 3, when driving by the user program, outputs commands in accordance with the user program as the hardware controller 3A and the script engine 3B cooperate. As the operation by the user program is performed, the enhanced functionality is provided to the user.

The operation unit of the present embodiment includes the motor 7 that rotates the hands 6. The drive unit 2 includes the motor drive circuit 21 that outputs the drive signals to the motor 7. The controller 3 outputs, in accordance with the user program, commands for operating the motor 7 to the drive unit 2. The fact that the control over the hands 6 is open to the user makes it possible to provide the enhanced functionality to the user.

The electronic watch 1 of the present embodiment includes the communication unit 4 configured to perform communication with the mobile communication device 50 and acquires the user program by wireless communication with the mobile communication device 50. The user program may be generated in the mobile communication device 50 or may be downloaded from the external server 200. Consequently, the user can easily incorporate the user program into the electronic watch 1.

The controller 3 of the present embodiment, in accordance with the user program, based on the information acquired from the mobile communication device 50 via wireless communication, outputs commands to the drive unit 2. The electronic watch 1 can provide enhanced functionality to the user by operating in conjunction with the mobile communication device 50.

The mobile device of the present embodiment is the electronic watch 1 and stores therein the drive program 35 of the machine language. The drive program 35 is one example of a control program corresponding to the type of the movement installed on the electronic watch 1. The controller 3, in accordance with the user program, outputs commands to the drive unit 2 by executing the drive program 35 that corresponds to the type. That is, the user program makes the program flow by determining the caliber of the electronic watch 1 and converting it to the form that matches the relevant caliber. As a result, according to the present embodiment, a common user program can be applied to a plurality of calibers. For example, it is assumed that the user owns a plurality of electronic watches 1 and the caliber of each electronic watch 1 is different from one another. Even in this case, the user can incorporate the same function into the multiple electronic watches 1 with the common user program.

The mobile device system 10 of the present embodiment includes the application 60 that is executed in the mobile communication device 50, and a mobile device such as the electronic watch 1. The application 60 generates the user program including script language. The mobile device includes the communication unit 4, the drive unit 2, and the controller 3 that includes the memory 8. The memory 8 stores therein the user program acquired by wireless communication with the mobile communication device 50. The controller 3, in accordance with the user program, outputs the command to the drive unit 2 and causes the operation unit to operate.

The mobile device system 10 of the present embodiment can provide the user the enhanced functionality and can suppress an increase in the size of the mobile device. The application 60 of the present embodiment provides the functionality of visual programming by the user interface 61. The user can create the user program by non-language programming via the user interface 61. Thus, the mobile device system 10 of the embodiment can provide enhanced functionality of the mobile device even for the users who do not have knowledge of embedded programming. In addition, because the script language has a high affinity for a cloud, functional cooperation between the mobile device system 10 and the cloud is easy.

In the mobile device system 10 of the present embodiment, the application 60 generates and stores a single block program by combining the user program with the cooperative program that is executed in the mobile communication device 50. The application 60 transmits the user program extracted from the block program to the mobile device such as the electronic watch 1. The fact that the user program and the cooperative program are put together into a single block program facilitates the management of the user program and the cooperative program, for example.

Modifications of Embodiments

Modifications of the embodiments will be described. The mobile device is not limited to the exemplified electronic watch 1. The mobile device of the embodiments applies to various devices including an electronic watch. The mobile device may have no analog display unit 26. The mobile device may be a smart-watch with a digital display.

The script language of the user program is not limited to the exemplified Lua. As the language of the user program, any desired script language can be used. The mobile communication device 50 is not limited to what is called a smartphone. As the mobile communication device 50, various devices that have the function of performing wireless communication with the mobile device can be used. The mobile communication device 50 may be a tablet device, for example.

The hands 6 for which the operation is open to the user are not limited to the second hand 6a. For example, the operation of any of the hands 6 out of the second hand 6a, the minute hand 6b, and the hour hand 6c may be open to the user. The hands 6 may include other hands in addition to the second hand 6a, the minute hand 6b, and the hour hand 6c. In this case, the operation of the other hands may be open to the user. When the mobile device includes a light-emitting element such as a light-emitting diode (LED), the operation of the light-emitting element may be open to the user. When the mobile device includes a digital display unit, the operation of the digital display unit may be open to the user.

The disclosed content in the above-described embodiment and the modifications can be implemented in combination as appropriate.

The mobile device according to the present embodiment includes a storage unit configured to store a user program, and the fact that the user can rewrite it freely makes it possible to provide enhanced functionality to the user. Furthermore, it has an effect in that an increase in the size of the mobile device is suppressed because there is no need to store a lot of computer programs in advance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile device comprising:
a controller;
a drive unit; and
an operation unit, wherein
the controller includes a storage unit, a hardware controller, and a script engine,
the storage unit stores therein in advance a main program described in machine language and a user program described in script language and obtained through an external device,
the hardware controller generates commands described in machine language by reflecting the main program to a drive program described in machine language and outputs the commands to the drive unit in a normal operation, and the hardware controller generates commands described in machine language by reflecting the user program to the drive program by using the script engine and outputs the commands to the drive unit in an operation by the user program,
the drive unit outputs a drive signal corresponding to the received command to the operation unit, and
the operation unit performs an operation corresponding to the input drive signal.

2. The mobile device according to claim 1, wherein
the operation unit includes a motor configured to rotate a hand,
the drive unit includes a drive circuit configured to output the drive signal to the motor, and
the controller outputs, in accordance with the user program, the command for operating the motor to the drive unit.

3. The mobile device according to claim 1, wherein
the external device is a mobile communication device, and
the controller, in accordance with the user program, based on information acquired from the mobile communication device by wireless communication, outputs the command to the drive unit.

4. The mobile device according to claim 1, wherein
the mobile device is an electronic watch and stores therein a control program of machine language corresponding to a type of a movement installed on the electronic watch, and
the controller, in accordance with the user program, outputs the command to the drive unit by executing the control program corresponding to the type.

5. The mobile device according to claim 1, further comprising:
a sensor configured to acquire information concerning the mobile device, wherein
the controller, in accordance with the user program, based on information acquired from the sensor, outputs the command to the drive unit.

6. The mobile device according to claim 1, wherein
the controller, in accordance with the user program, based on a state of a power source, outputs the command to the drive unit.

7. A mobile device system comprising:
an application executed in a mobile communication device and configured to generate a user program described script language; and
a mobile device, wherein
the mobile device includes a controller, a drive unit, and an operation unit,
the controller includes a storage unit, a hardware controller, and a script engine, the storage unit stores therein in advance a main program described in machine language and a user program described in script language and obtained through an external device, the hardware controller generates commands described in machine language by reflecting the main program to a drive program described in machine language and outputs the commands to the drive unit in a normal operation, and the hardware controller generates commands described in machine language by reflecting the user program to the drive program by using the script engine and outputs the commands to the drive unit in an operation by the user program, the drive unit outputs a drive signal corresponding to the received command to the operation unit, and the operation unit performs an operation corresponding to the input drive signal.

8. The mobile device system according to claim 7, wherein the application generates and stores a single block program by combining the user program with a cooperative program that is executed in the mobile communication device and configured to cooperate with the user program, and the application transmits the user program extracted from the block program to the mobile device.

\* \* \* \* \*